G. W. HAMILTON.
HEAT RESPONSIVE CURRENT CONTROLLING DEVICE.
APPLICATION FILED OCT. 11, 1920.

1,402,417.

Patented Jan. 3, 1922.

Inventor
George W. Hamilton

By Foneé Rain & Hinkle
Attys.

UNITED STATES PATENT OFFICE.

GEORGE W. HAMILTON, OF CHICAGO, ILLINOIS, ASSIGNOR OF ONE-HALF TO LEE W. POPP, OF CHICAGO, ILLINOIS.

HEAT-RESPONSIVE CURRENT-CONTROLLING DEVICE.

1,402,417.  Specification of Letters Patent.  Patented Jan. 3, 1922.

Application filed October 11, 1920. Serial No. 416,178.

*To all whom it may concern:*

Be it known that I, GEORGE W. HAMILTON, a citizen of the United States, residing at Chicago, in the county of Cook and State of Illinois, have invented certain new and useful Improvements in Heat-Responsive Current-Controlling Devices, of which the following is a specification.

This invention relates to improvements in heat responsive current controlling devices.

One of the objects of the invention is to provide a current controlling device responsive to variation of temperature of an object to be heated by electricity, which will automatically reduce the current applied thereto, upon rise of temperature to a predetermined degree, tending to maintain the current and resultant heat, constant within a given scope of operation, and which will finally automatically operate to open the circuit, and hold it open, upon the occasion of a sudden or excessive and dangerous rise of temperature or prolonged accumulation of heat, of said object, so that thereafter the circuit must be manually closed to again heat the object.

The device is especially valuable for use in connection with electrically heated sad-irons and it may be so adjusted that when the iron is in operation, performing the desired function with heat being diffused therefrom by contact with the dampened fabric, current of definite value will pass through the heating coils to maintain the heat substantially constant, or to supply additional current to compensate for the dispersed heat. It will automatically reduce the current, or prevent its rise during relatively short periods of inactivity, as when the iron operator is adjusting the fabric or changing fabric, and which will operate to automatically and permanently open the circuit when the period of inactivity of the iron becomes prolonged and the accumulation of heat is excessive to an extent to become dangerous as a means for instigating a conflagration.

Users of irons of this character frequently neglect to turn off the current after they have finished using them and as often leave them in contact with combustible material. Without an automatic safeguard such a careless procedure usually results in a disasterous conflagration.

In the accompanying drawings I have shown schematically a means by which my invention may be carried into effect.

In all the views the same reference characters are employed to indicate similar parts.

Figure 4:
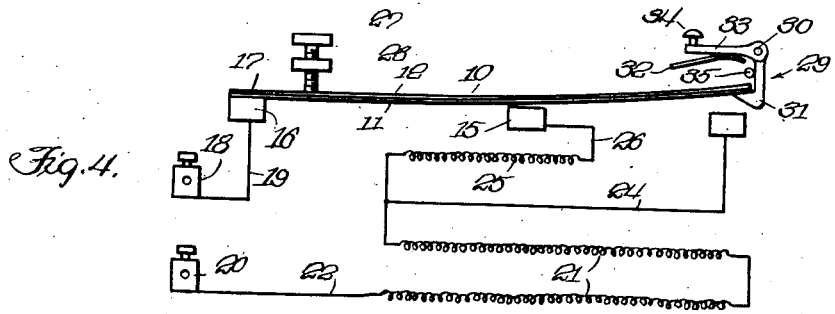
Fig. 4 shows the circuit through the heating coils entirely open and permanently held open, so as to require manual operation of the switch or latch to re-establish the circuit.
Figure 5:
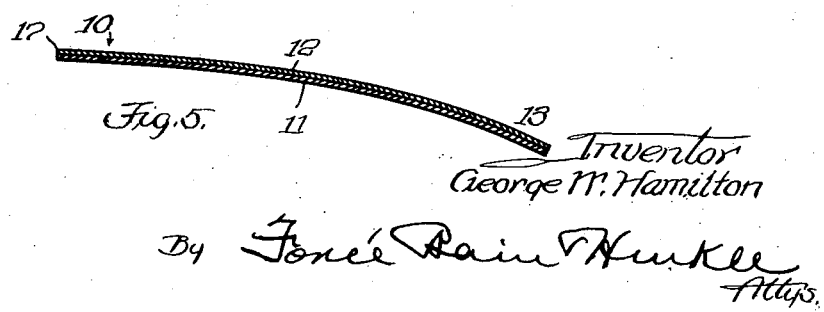
Fig. 5 shows the initial shape of the expansion bar before it is placed in position with respect to its support and contact.

10 is an expansion bar composed of two contacting metals having different co-efficients of expansion. The bar 11 has a relatively high co-efficient of expansion while the bar 12, in contact therewith, is of a character to expand to a less degree with the same rise of temperature so that the bar will be curved upwardly or in an opposite direction to that shown in Fig. 5, and substantially as shown in Fig. 4, upon the occasion of excessive heat. The bar is initially deformed from straight alignment into the curved shape shown in Fig. 5, so that the free terminal end 13 will rest with some pressure upon the contact 14, whereupon the contact 15 is not in connection with any part of the bar. The other fixed end of the bar is secured permanently to contact 16.

The contact 16 is connected to a terminal 18 by wire 19 and the terminal 20 is connected to the most efficient heating coil 21, by the wire 22. The terminal end 23 of the heating coil 21 is connected by wire 24 to the contact 14. The same end 23 of the coil 21 is connected to a less efficient heating coil or suitable resistance 25 which, in turn, is connected to the contact 15 by wire 26.

A screw 27 may be threaded into a support 28 and is a means for varying the tension applied to the upper surface of the bar 10 to increase or decrease its initial pressure of the free end 13 with the contact 14, by means of which its operative susceptibility to rise of temperature may conveniently be varied.

Figure 1:
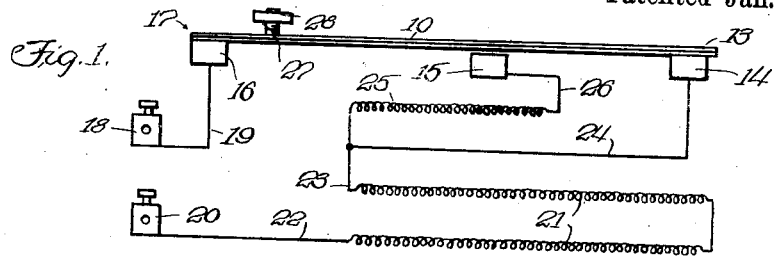
Fig. 1 shows the apparatus with the most effective heating coil in circuit.

In Fig. 1 the current passes through the heating coil 21 and the expansion bar 10 and not through the coil 25. Therefore the heating device is operating with its highest efficiency.

Figure 2:
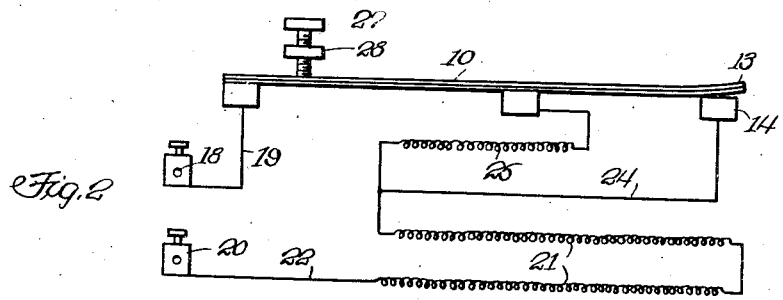
Fig. 2 shows the apparatus with the most effective heating coil about to be connected in series with a less effective coil so as to reduce the value of the current passing through the effective heating coil.
Figure 3:
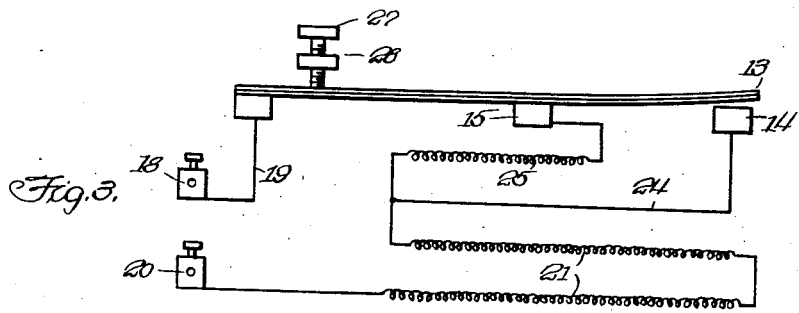
Fig. 3 shows this result accomplished.

When the temperature to which the bar 10 is subjected begins to rise to a point near an excessive degree, the outer end of the bar 10 begins to curl upwardly, as shown in Figs. 2 and 3. In Fig. 2 the circuit is yet closed between the bar and the contacts 14 and 15 but subsequently, as the temperature rises, the bar will curve to a greater extent, as shown in Fig. 3, whereupon connection of contact 14, with the bar 10, is broken and therefore the current must pass through the coil 25 and also the coil 21. This increases the resistance of the path for the current and consequently decreases the current that will flow through this path and therefore the heat of the iron is correspondingly diminished. Inasmuch as the heat varies rapidly in degree the bar 10 will be, to some extent, vibrated by the rapid changes of temperature, whereupon the coil 25 will be cut in two and out of circuit by the changes of position of the bar, as shown when comparing Figs. 1 and 2. Subsequently the outer end 13 of the bar will vibrate, as shown by the relative position of the bar in Figs. 2 and 3, and, upon an excessive and prolonged accumulation of heat, the bar will entirely leave both contacts 14 and 15 and the persistence of heat in the lower member 11 of the bar will be sufficient to carry the outer end 13 of the bar above the latch member 29.

The latch, as shown, is of bell-crank form pivoted, as at 30, and having an end 31, to engage the outer end 13 of the bar. A spring 32 holds the end 31 in position for ready engagement with the end of the bar and a button 34 on the horizontal member 33 of the latch member is a means by which the end 31 may manually be disengaged from the end of the bar.

From the foregoing description, it will be ascertained that the expansion bar controls two separate contacts in such manner as to alternately increase and decrease the resistance through a set of heating coils and that this effect is produced to some extent by the variation in rapidity of vibration. The time factor governing the aggregate flow of current through this means produces the variation of heat.

While I have herein shown a schematic arrangement of devices for carrying my invention into effect, it will be manifest, to persons skilled in the art, that considerable change in the arrangement and configuration of the parts may be made, within the scope of the appended claims.

Having described my invention what I claim as new and desire to secure by Letters Patent is:—

1. A device of the character described comprising a composite expansion bar composed of two parallel bars having different co-efficients of expansion initially curved so that the outer surface of the bar having greater co-efficient of expansion is concave and that of the other bar is convex; means to hold one end of the bar fixed; a contact block upon which the other end of the bar having the higher co-efficient of expansion normally rests the position of the block being such that the bar is substantially straight when its free end rests upon said block; and a second contact block, intermediate the two ends of the bar, normally out of contact therewith when the bar is substantially straight.

2. A device of the character described comprising a composite expansion bar composed of two parallel bars having different co-efficients of expansion initially curved so that the outer surface of the bar having greater co-efficient of expansion is concave and that of the other bar is convex; means to hold one end of the bar fixed; a contact block upon which the other end of the bar having the higher co-efficient of expansion normally rests the position of the block being such that the bar is substantially straight when its free end rests upon said block; a second contact block, intermediate the two ends of the bar, normally out of contact therewith when the bar is substantially straight and a latch to hold the bar out of contact with the blocks when curved to a predetermined extent by heat.

In testimony whereof I hereunto subscribe my name.

GEORGE W. HAMILTON.